United States Patent [19]
Busch

[11] 3,968,454
[45] July 6, 1976

[54] SIGNALING CIRCUIT
[75] Inventor: Aloysius J. Busch, Madison, N.J.
[73] Assignee: Bell Telephone Laboratories, Incorporated, Murray Hill, N.J.
[22] Filed: Sept. 27, 1944
[21] Appl. No.: 555,914

[52] U.S. Cl. .................................. 331/78; 178/22; 179/1.5 R
[51] Int. Cl.² ......................................... H04L 9/04
[58] Field of Search ................ 250/27, 27 T, 27 TR, 250/36, 13.2; 179/18, 1.5 R; 331/78; 178/22; 235/92 M, 92 NG

[56] References Cited
UNITED STATES PATENTS
2,308,778  1/1943  Prince, Jr. ...................... 250/27 TR

Primary Examiner—Maynard R. Wilbur
Assistant Examiner—H. A. Birmiel
Attorney, Agent, or Firm—H. A. Burgess

EXEMPLARY CLAIM

1. In a pulse-producing system, a plurality of space discharge tube ring circuits each comprising a different number of stages, the numbers of stages in the rings having no common factor greater than one, means to cause said rings to step in unison, means to derive output voltage pulses from certain stages of individual rings and spaces from the other stages, and means to combine the outputs of all of said rings in a common utilization circuit.

19 Claims, 9 Drawing Figures

FIG. 2

INVENTOR
A.J. BUSCH
BY H.A. Burgess
ATTORNEY

SIGNALING CIRCUIT

The present invention relates to electrical switching or control circuits for various purposes including the production of pulses having a highly irregular distribution of pulse value with time. Such pulses may be used, for example, for enciphering message currents to be secretly transmitted and for deciphering secretly transmitted message currents at the receiving point. The invention provides for the generation at separated stations of duplicate pulses as a function of the generating circuits, the pulses occurring, as already noted, with a practically random distribution of pulse value with time. The invention removes the necessity of transporting records or the like from one station to the other from time to time as heretofore proposed for supplying duplicate key pulses at both stations for enciphering and deciphering purposes.

One object of the invention is to generate pulses having approximately random or fortuitous distribution with time in such manner that the pulses can be duplicated at other locations by use of duplicate apparatus similarly adjusted and operated.

Another object is to generate such pulses by means of apparatus which is wholly or substantially wholly electronic in character.

A further object of the invention is to provide variable circuit operation under control of space discharge tubes operating in closed rings wherein rings of different numbers of stages cooperate in parallel or in tandem.

A further object of the invention is to combine regularly stepping ring circuits of the character indicated with irregularly stepping ring circuits to produce variable circuit operations.

A further object of the invention is, apart from the specific character of the component circuit elements used, to combine series of sequences of two-valued pulses in different ways to produce a highly irregular order of occurrence and thereafter to translate the final two-valued pulses into multivalued pulses having practically random distribution of pulse value with time.

The nature and objects of the invention will be more clearly understood from the following detailed description of a typical embodiment as illustrated in the accompanying drawings in which.

Figures 1, 9:
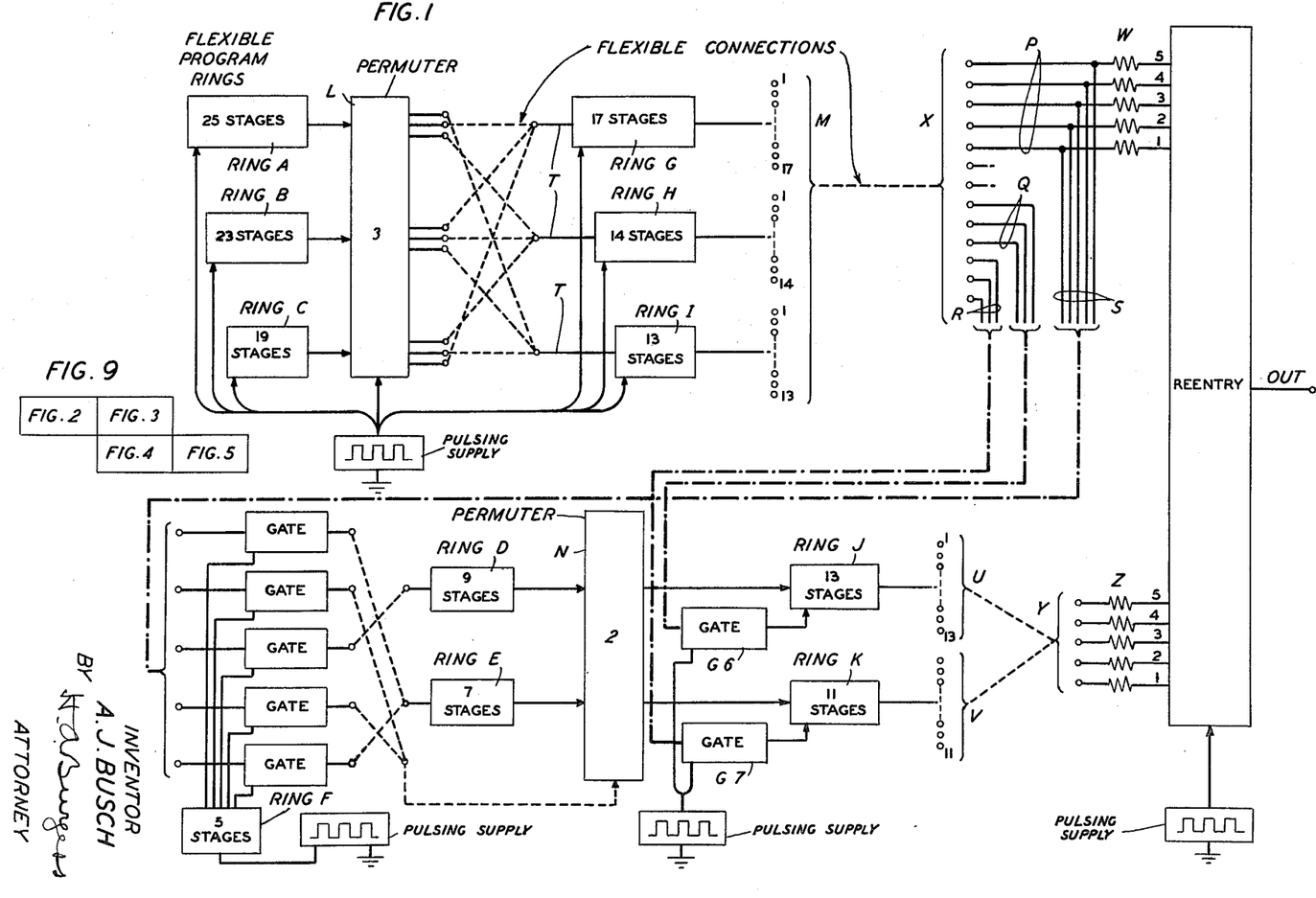
FIG. 1 is an over-all block schematic or functional diagram showing how the different parts are related and cooperate with each other.

Referring to FIG. 1, the upper part of the diagram illustrates the primary key-producing equipment feeding into the reentry circuit on the right through five weighting resistances W. The lower part of the diagram shows auxiliary apparatus for also feeding pulses through the five weighting resistances Z into the same reentry circuit for combining with the pulses supplied through the resistances W. The effect of the auxiliary apparatus may be considered as modifying the action of the main key producer circuits so as greatly to add to the difficulty of the solver in getting any clue to the scheme employed in the main part of the key-producing system.

Referring to the main key-producing system in the upper part of the figure, the circuits on the left-hand side feed two-valued pulses or marks and spaces in highly irregular order into the terminals marked by the bracket X. Considering for the moment only the upper five conductors P, these pass through different sized resistors W which translate the marks, all of which have the same amplitude, into pulses of respectively five different amplitudes, indicated by the numerals 1 to 5, as these leads enter the reentry circuit. Similarly, in the lower part of the diagram, marks and spaces are supplied in highly irregular order to the terminals Y and the marks, all having the same amplitude, are translated by the different valued resistors Z into pulses of five different amplitudes before they are applied to the reentry circuit. Some of the X terminals are connected to conductor groups Q, R and S which are brought to different parts of the auxiliary circuits for exerting controls upon them, as will be described.

The main key-producing system, in the specific illustrative example given, starts out with the rings A, B and C containing, respectively, 25, 23 and 19 stages which are caused to step at 500 cycles per second under control of the 500-cycle pulsing supply indicated. The numbers of the stages in these three rings are prime to each other so that the three rings together execute a cycle the length of which is proportional to the product of their numbers of stages. These rings supply pulses to the permuter L. They do not, however, necessarily supply a pulse for each step of the ring since each ring is provided with keys or switches which can be operated in any combination desired to determine whether any stage of the rings in firing supplies a pulse to the permuter L or does not supply a pulse. These rings A, B and C, therefore, supply very irregular sequences of pulses to the permuter L and these sequences can be varied from time to time by changing the settings of the program-controlling keys.

The permuter L distributes the pulses received from the A ring in rotation to the three terminals in the upper group; the pulses from the B ring to the three terminals of the middle group and the pulses from the C ring to the three terminals of the lower group. This permuter is supplied with 500-cycle pulses for performing its switching functions.

Flexible conductors which can be changed from time to time are used to join these nine output terminals to the three conductors T leading to the rings G, H and I containing, respectively, 17, 14 and 13 stages. The ring includes switching tubes for distributing input pulses (marks) over the first seventeen terminals in the group M. Marks and spaces, therefore, appear on these seventeen terminals in rotation depending upon whether marks or spaces are applied to the input of the ring in the particular time interval. Similarly, rings H and I distribute the input marks and spaces over, respectively, 14 and 13 terminals in the group M. The forty-four terminals in the group M permit a large choice of possible connections to the twelve terminals in the group X by means of flexible leads. Several of the terminals M can be connected to one terminal X, if desired, or only a fraction of the terminals M may be used in any one arrangement.

The system up to this point provides for the setting up on each of the conductors P of a highly irregular sequence of marks and spaces and, as above noted, the marks appearing on any one conductor are translated into pulses of a definite value individual to that conductor. However, if these pulses were the only key materials supplied to the reentry circuit, the amount of privacy would be limited on account of the comparatively short cycles of the rings A, B, C, G, H and I. Therefore, the auxiliary keying equipment in the lower part of the figure is added to effectively disguise the cylical character of the main keying equipment.

In the auxiliary equipment the five leads S are carried to five gates which are operated in rotation by the five-stage ring circuit F at the rate of 500 steps per second. If no pulse is present on the first conductor S when the first gate is opened by the ring F, zero voltage is produced on the output terminal of the gate. If a pulse is present when the gate is open, a pulse is produced on the output terminal of the gate. This is true of each of the five gates. The five output gate terminals may be connected in different arrangements to control the rings D and E and the permuter N. The rings D and E comprising, respectively, 9 and 7 stages do not step regularly but step only in response to applied pulses on their input terminals. These rings D and E are variable program rings in that keys or the like are provided for determining whether a stage in firing applies a pulse or no pulse to the permuter N. The programs of these rings may be changed from time to time.

The premuter N is a two-position device and switches in irregular order the outputs of the rings D and E to the inputs of the rings J and K. These latter rings comprise, respectively, 13 and 11 stages which are stepped irregularly under the control of the gates G6 and G7. These rings take a step whenever a corresponding gate G6 or G7 is operated to transmit a pulse into the ring. The gates G6 and G7 are controlled, respectively, from the groups of conductors Q and R, and various conditions can be imposed upon this control. For example, the circuit may be arranged so that no pulse must be present on any of the three conductors in the group Q (or R) at the same time that a pulse from the 500-cycle source is applied to the respective gate in order that a pulse be sent into the ring to cause the latter to take a step. When the ring J or K steps, if a pulse is being applied to the ring from the permuter N at this time, a pulse will appear on one of the 13 or 11 output terminals depending upon which tube in the ring is operative at this time. The rings operate, therefore, to distribute the pulses from the permuter N to different terminals in the groups U and V. These groups of terminals may be variously connected to the six terminals in the group Y by flexible leads which may be changed from time to time.

It will be noted that one of the terminals in each of the X and Y groups is marked zero. This terminal has no connection to the reentry so that whenever pulses are impressed upon this terminal no corresponding pulse is transmitted to the reentry. Since only one tube is fired at a time in each of the rings G, H, I, J and K, a maximum of five terminals in the X and Y groups can have marking pulses applied to them at any instant. This means that the highest pulse value that can be applied to the input of the reentry circuit is 5+5+4+4+3 or twenty-one steps. Assuming it is desired to produce output pulses covering the range 0 to 5 steps, it is necessary to provide a reentry at the values 6, 12 and 18 in the reentry circuit.

Figure 2:
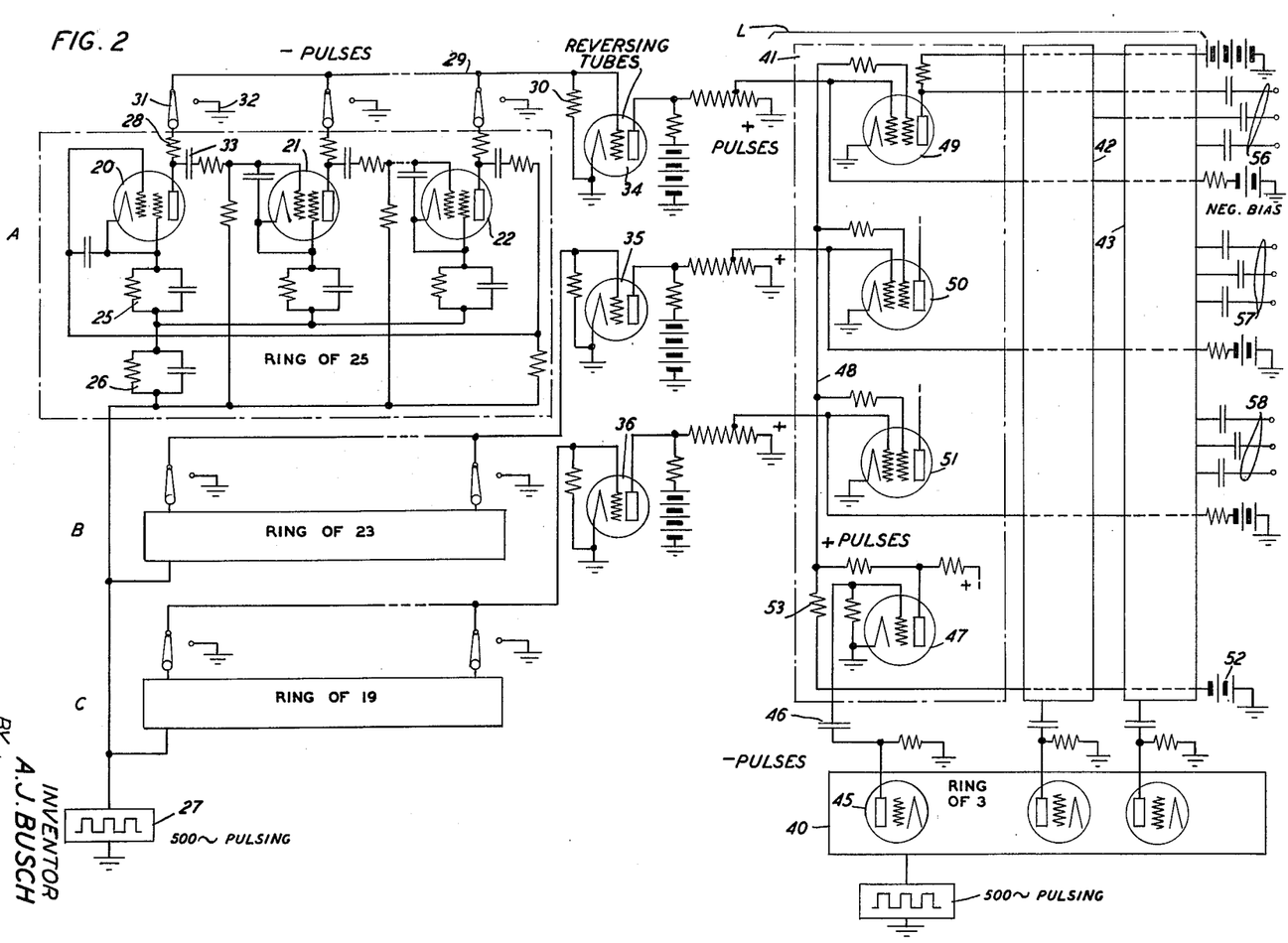
FIGS. 2, 3, 4 and 5 when placed together as indicated in FIG. 9 show in schematic circuit diagram the detailed circuits for performing the functions indicated in FIG. 1.

Referring to FIG. 2, a circuit of the A ring is shown in detail, the rings A, B and C being identical except for the number of stages. The A ring comprises 25 gas-filled tubes as stages, of which the first two are shown at 20 and 21 and the last one at 22. An individual combination of biasing resistor and shunting condenser 25 is provided in the cathode lead of each tube and a common biasing circuit 26 is provided in the common cathode lead of all tubes. Plate voltage is applied to the cathodes from the 500-cycle pulsing source 27, the plates of all stages being connected to ground either through output resistors 28 leading to the common output conductor 29 and through grid leak resistor 30 to ground or in case the switch 31 of any stage is thrown to the right, the connection leads directly to ground at 32. Assuming that the ring has been started and that tube 20 is fired, a voltage is placed on condenser 33 because of the voltage drop appearing across the tube 20 in series with impedances 25 and 26. The tube 20 is fired during the times when the 500-cycle pulsing voltage drives the cathodes negative. During the next supply pulse the current through tube 20 is interrupted by the positive voltage applied to the cathode. On the next voltage reversal which makes all cathodes of the tubes negative, only the tube 21 will fire since the grids of all the other tubes are too far negative to allow those tubes to fire but the charge stored in condenser 33 makes the voltage on the control grid of the tube 21 sufficiently positive to permit this tube to fire. The time constant of the circuit including the capacity 33 is adjusted so that the charge on condenser 33 leaks off sufficiently fast to prevent tube 21 from refiring on the next negative pulse of the exciting voltage.

Assuming that the switches 31 of the various stages are differently positioned, it will be seen that marks and spaces at the rate of 500 per second are supplied to the conductor 29, the marks coming from the tubes which have their switches thrown to the left and the spaces occurring in the case of those tubes which have their switches 31 thrown to the right, the space meaning that the mark which would otherwise be transmitted by the firing of a tube at that instant is shunted directly to ground instead of being applied to conductor 29. In a similar manner the rings B and C supply irregular series of marks and spaces to the tubes 35 and 36. The tubes 34, 35 and 36 are phase reversing tubes for converting the negative pulses applied to their grids into positive output pulses.

The permuter L comprises a ring of three stages shown at 40 and three columns of tubes, one of which is shown in the dotted line enclosure 41 and the others are assumed to be similarly arranged in the boxes 42 and 43. The ring 40 is driven from the same 500-cycle pulsing source as the rings A, B and C and in step therewith. Whenever a stage such as 45 fires, it sends a negative pulse through the coupling condenser 46 to the grid of the phase reversing tube 47 which converts the pulse into a positive pulse which is applied over the lead 48 to the second grid of each of the switching tubes 49, 50, 51. These grids are normally maintained at highly negative potential from battery 52 through resistor 53. The positive pulse applied, as described, from tube 47 throws the bias on the second grids of tubes 49, 50 and 51 sufficiently positive to permit these tubes to transmit saturation current when a positive pulse is applied to the control grid from the corresponding phase reversing tube 34, 35 or 36. It is seen, therefore, that when stage 45 of the ring 40 fires, a mark or a space will appear on one output terminal in each of the three groups shown at 56, 57 and 58 depending upon whether a mark or a space is received from the corresponding ring A, B or C. When the next stage of the ring 40 fires, marks or spaces appear on the next terminal of each of the three groups 56, 57 and 58 and similarly when the third stage fires, the marks and spaces are transmitted to the third terminal of each group. The permuter L, therefore, serves to distribute the marks and spaces generated by the rings A, B and C over the three sets of terminals 56, 57, 58. Flexible connections are shown by the dotted lines in FIG. 3 for variously connecting these three sets of terminals to the grids of the reversing tubes 60, 61 and 62.

Figure 3:
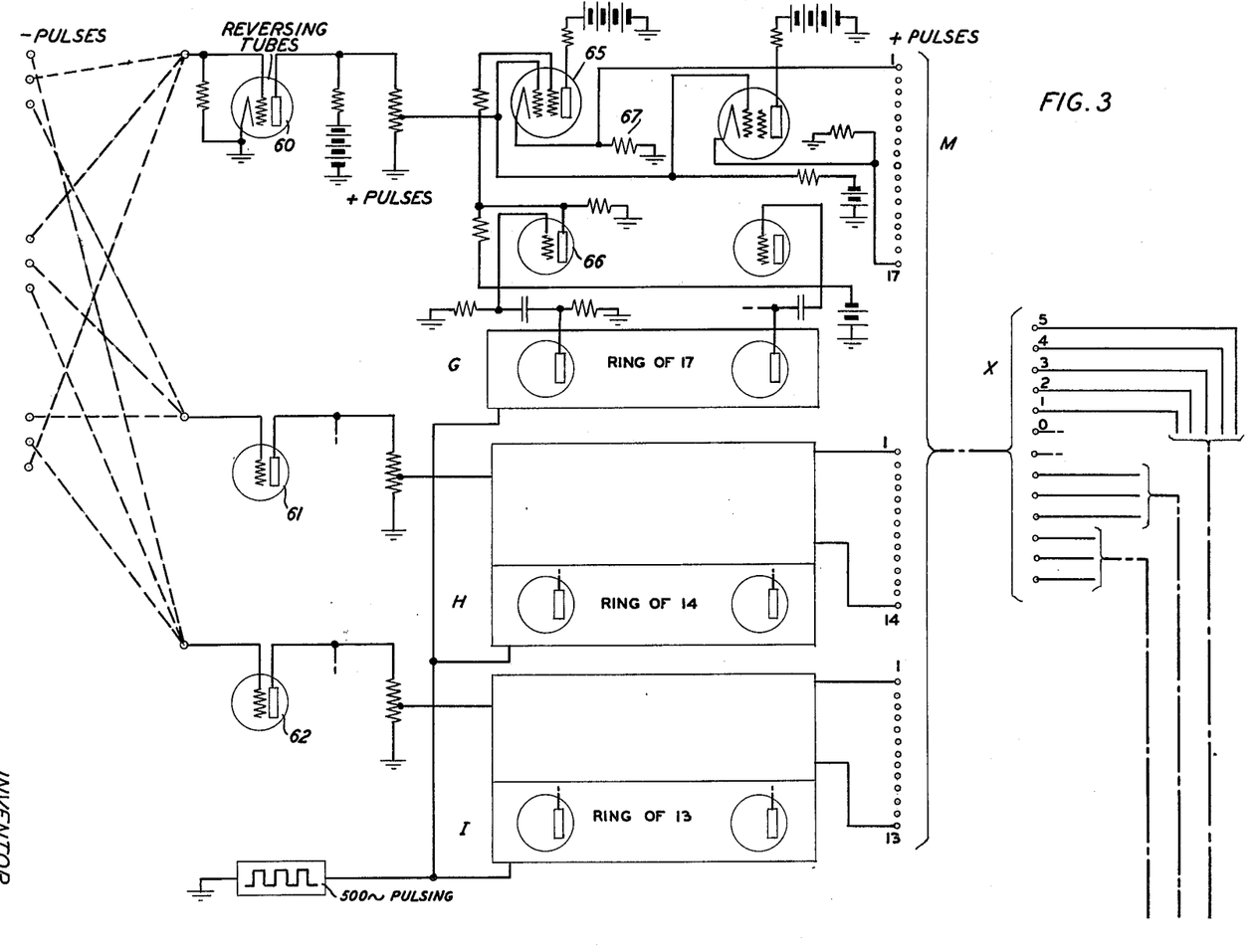

The arrangement in each of the rings G, H and I is similar except for the number of stages. Considering the G ring, the circuit is similar to that of the permuter L except that only one switching tube 65 is shown per stage of the ring. The reversing tubes 66 are shown immediately below the switching tubes. When the first tube of the ring G fires, it causes the reversing tube 66 to apply a positive voltage to the second grid of the switching tube 65. If at that time the control grid of this tube is receiving a mark from the permuter L, the tube 65 transmits saturation current and the drop of potential across the cathode coupling resistor 67 is applied to the corresponding one of the upper seventeen terminals in the M group. If a space is applied to the control grid of the tube 65 at this instant, no voltage drop appears across resistor 67 and zero voltage is applied to the corresponding output conductor at M. The rings G, H and I, therefore, act as distributors to distribute the marks and spaces received from the permuter L in regular rotation over each of the terminal groups in the terminal bank M. As previously noted, selected terminals in these groups are connected by flexible leads across to the twelve terminals of the X group.

Figure 4:
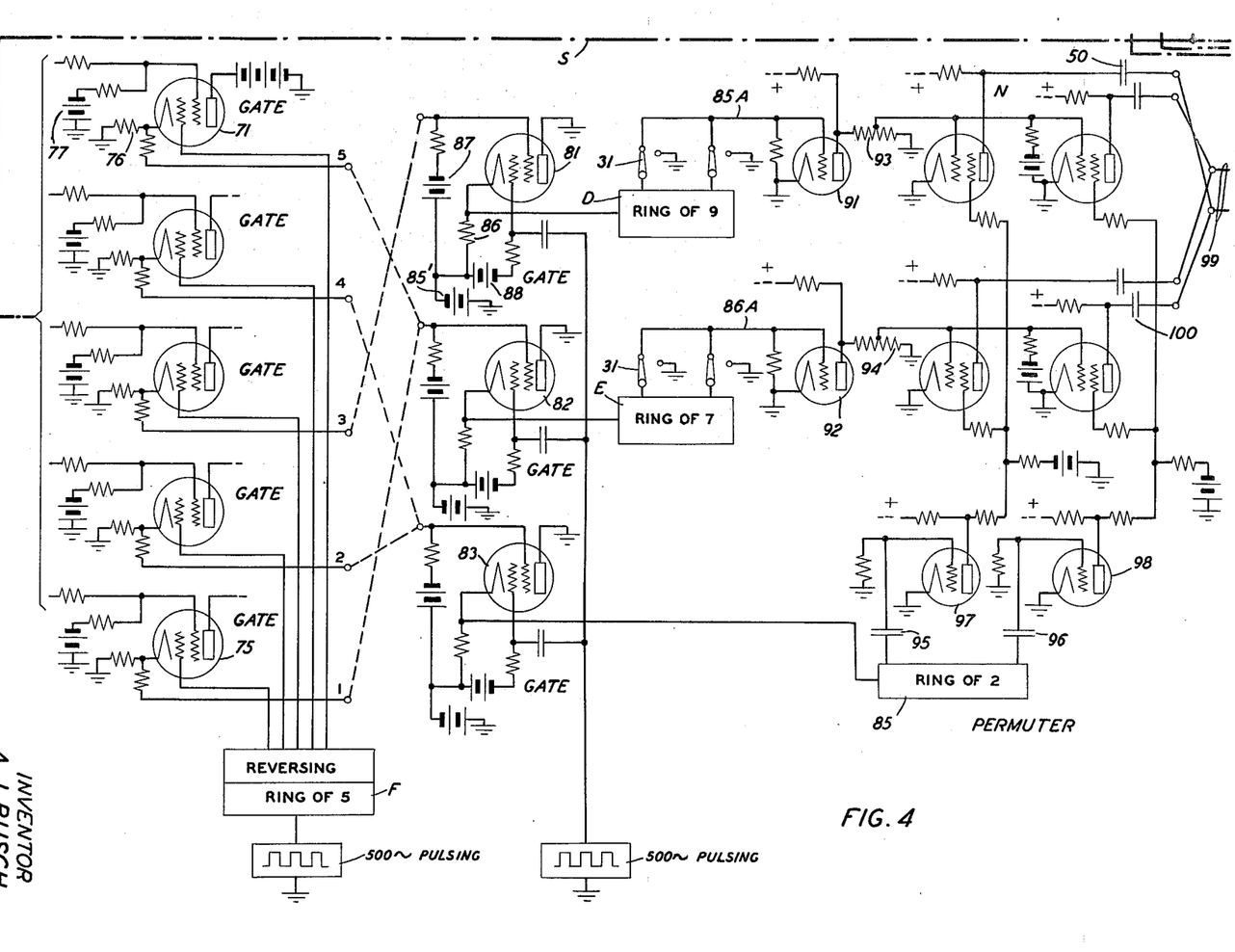

Referring to FIG. 4, the five S leads are brought to the input sides of the five gate tubes 71 to 75 and when marks are present on any one of these leads, a corresponding positive pulse is applied to the second grid of the corresponding gate tube. The ring F of the five stages is similar to the rings G, H and I and applies through corresponding reversing tubes positive potentials in rotation to the inner or control grids of the gate tubes 71 to 75. When any gate tube has a positive pulse on both of its grids, it conducts saturation current through the cathode resistor 76 and applies a positive pulse to the corresponding one of the five output terminals. If no positive pulse is present on an S lead when the inner grid of any gate tube is thrown positive by the ring F, the corresponding gate tube remains cut off by the normal negative bias of the second grid supplied from the biasing battery 77.

Gate tubes 81, 82, 83 control the stepping of the rings D and E and 85 which are similar to each other except for the number of stages. Considering the D ring, the circuit arrangement of the ring proper is the same as that of the A ring except that no 500-cycle pulses are supplied to the cathodes. Instead, the cathodes of all of the ring tubes are held at negative potential whenever gate tube 81 is cut off, this negative potential being supplied from the battery 85 through cathode resistor 86. Tube 81 is cut off except when both of the grids are thrown positive. The grids are normally held negative by the respective bias batteries 87 and 88. The outer grid is thrown positive whenever a marking pulse is received from the corresponding gate tube 71 to 75 and the inner or control grid is thrown positive for a brief instant 500 times per second under control of the pulsing supply. When a mark is present on the grid of tube 81 and a positive pulse from the pulsing supply is applied to the control grid, tube 81 passes saturation current and its cathode is reduced to nearly ground potential by the potential drop across resistor 86 so that all cathodes of the ring D are brought to approximately ground potential. This causes the ring tube which was fired to restore. As long as this tube was fired, a charge was maintained upon the coupling condenser corresponding to 33 of the A ring, maintaining the grid of the next succeeding tube in condition for firing. As soon as the pulsing supply removes the positive pulse from the control grid of gate tube 81, therefore, all cathodes of the tubes of the D ring are again thrown to negative potential and the next succeeding tube fires as determined by the charge upon the coupling condenser 33 in its grid circuit. This same action takes place in the rings E and 85.

The D and E rings are also provided with keys or switches 31 similar to those in the rings A, B and C for permiting their programs to be changed from time to time as desired. Although the D and E rings step in response to applied pulses from the gate tubes 71 to 75 and fail to step in response to applied spaces, they do not necessarily apply marks and spaces in this order to their outgoing conductors 85A and 86A since any of the keys 31 if thrown to the right converts a mark to a space. Moreover, consider that a stage in the D ring has taken a step in response to a marking pulse and that the corresponding key 31 is connected with the output conductor 85A so that the mark was transmitted. If the next signal is a space the ring tube in question converts this to a mark since it continues to transmit current to the conductor 85A as long as an unbroken succession of spaces is received. The rings D and E, therefore, may be considered as generators of new series of marks and spaces for this reason and, further, because the nature of the output can be changed by the program keys 31.

Figure 5:
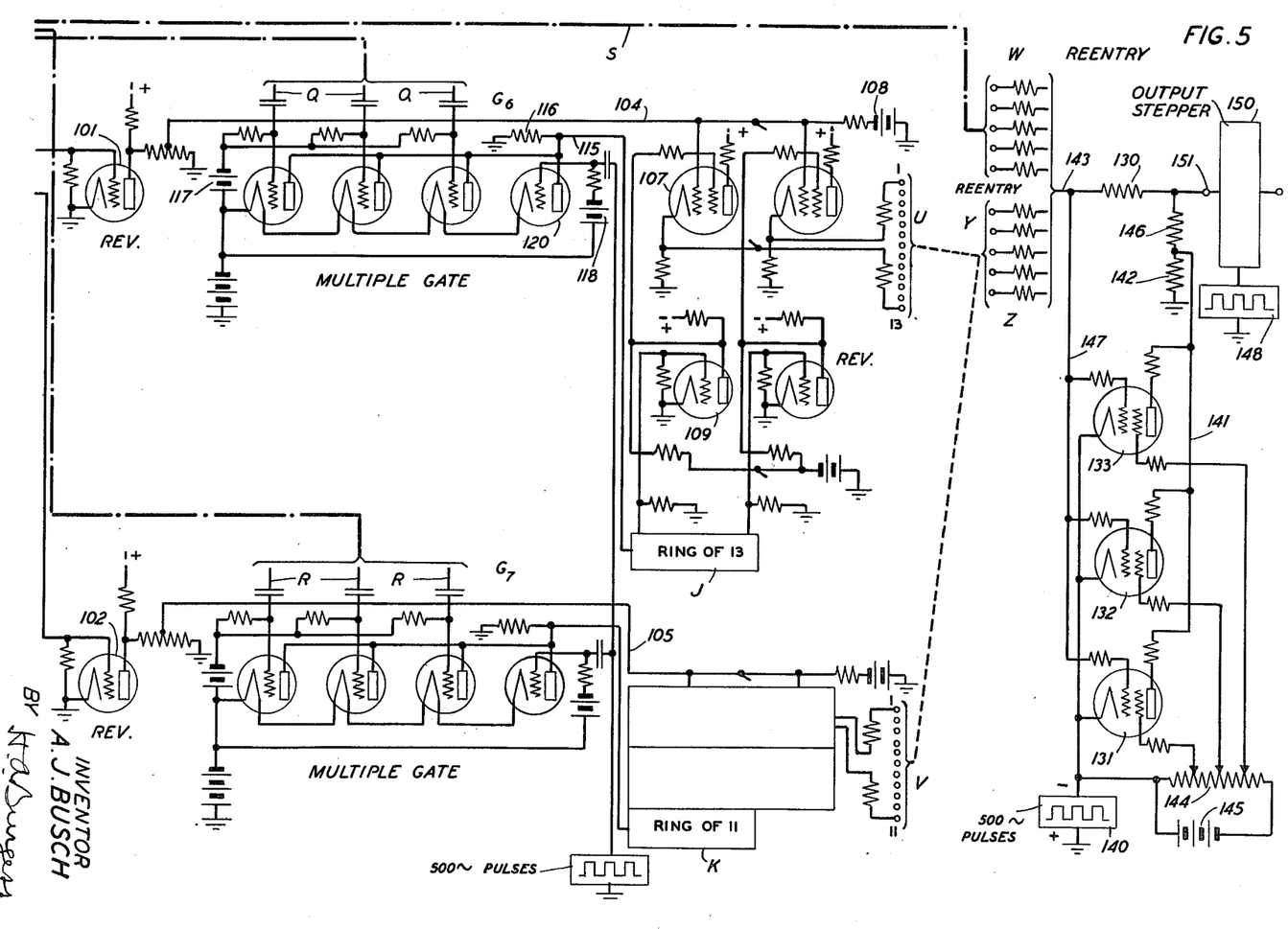

The permuter N, except for the number of stages, is the same as the permuter L with the further exception that the ring 85 instead of being regularly stepped 500 times per second is irregularly stepped in the manner just described under control of the gate tube 83. Reversing tubes 91 and 92 are inserted between the D and E rings and the switching tubes of the permuter N. If the D or E ring does not step for some time, steady negative voltage is applied to the conductor 85A or 86A as already mentioned resulting in application of positive voltage from the potentiometer 93 or 94 of the corresponding reversing tube to the control grids of the corresponding switching tubes in the permuter N. The corresponding switching tubes, however, are not biased to transmitting condition except when positive voltage is also simultaneously applied to the second grid in each case. This does not happen except when the ring 85 takes a step and transmits a momentary negative pulse through the coupling condenser 95 or 96 to the grid of the reversing tube 97 or 98. The switching tubes are without current, therefore, during such times as the ring 85 may fail to step and no marks can be transmitted through the permuter N except when the ring 85 takes a step. At all other times the outgoing conductors 99 receive no voltages through the coupling condensers 100 from the tubes of permuter N. When a switching tube is changed from non-conducting to conducting condition a negative pulse is applied over corresponding conductor 99 to the grid of one of the reversing tubes 101, 102 (FIG. 5).

These reversing tubes are normally supplying very low positive voltage over conductors 104, 105 and the inner grids of switching tubes 107, etc., associated with the rings J and K are normally negatively biased from source 108. When a mark is received from the permuter N, the voltage on the respective conductor 104, 105 is thrown momentarily highly positive. Considering the J ring, whenever the ring is not stepping, a steady negative potential is supplied to the grid of the corresponding reversing tube 109 which in turn supplies a steady positive voltage to the second grid of the switching tube 107. This tube, however, due to the normally high negative bias on its inner grid is normally cut off and normally maintains zero voltage upon the corresponding output terminal of the group 1 to 13 at U. A mark received from permuter N by tube 107 causes this tube to conduct saturation current and to apply positive voltage to terminal 13 at U. Since only one of the switching tubes 107 can be conducting at a time, this positive voltage appears on only one of the terminals in the group U at a time. When the J ring takes a step the control is thrown to the next switching tube and during the condition of a space from permuter N on conductor 104, a zero voltage is maintained on the next terminal of the group U.

Figure 7:
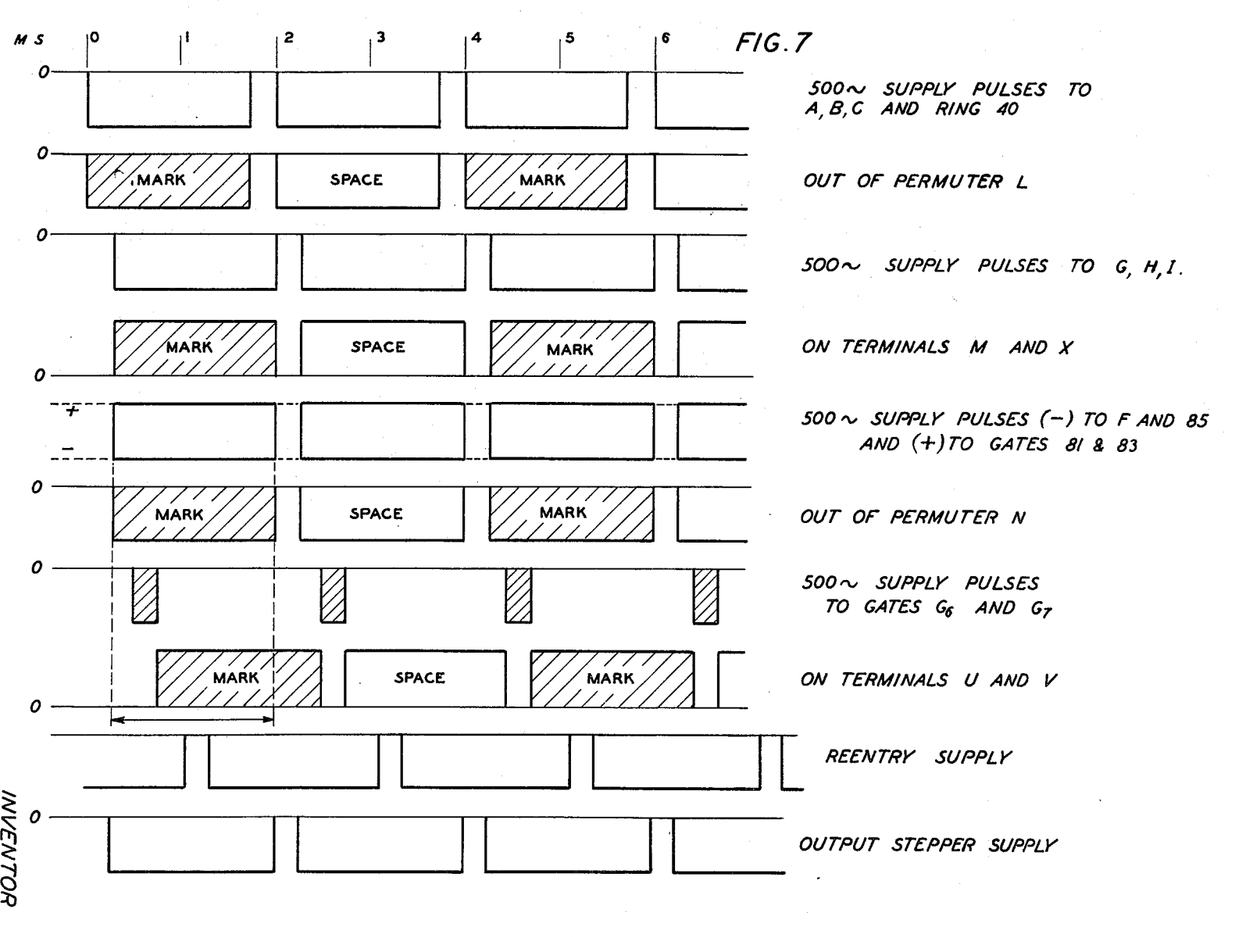
FIG. 7 is a timing chart for this system.

The rings J and K are stepped similarly to the rings D and E as previously described except that in this case a multiple gate G6 or G7 instead of a single tube gate is provided. When the gate G6 is transmitting current, negative voltage is supplied over conductor 115 to the cathodes of all of the tubes in the ring J, this negative voltage being produced by the flow of current through the resistor 116. The grids of all sections of the multiple gate tube are normally biased negatively beyond cut-off by the batteries 117 and 118. When any one of the grids is driven positive and causes the corresponding section to pass current, the negative voltage referred to is applied over conductor 115 to the ring circuit. In order that this voltage be changed from a negative value to zero, it is essential, therefore, that none of the four grids shall have a positive voltage supplied to it. This can only happen if no marking pulse is on any one of the three conductors Q and if the 500-cycle pulsing supply is supplying a negative pulse. If no one of the Q conductors has a marking pulse on it when the pulsing supply drives the grid of tube 120 positive, the negative voltage is again supplied to all of the ring circuit tube cathodes over conductor 115 and the ring is caused to take a step. It will be noted from the timing diagram that the grid of tube 120 is held positive at all times except for a brief interval in each pulsing cycle, when it is driven negative. This insures that a negative voltage is held on conductor 115 to maintain one of the ring tubes energized at all times except during the stepping instant. The timing diagram shows that the pulse on the Q conductors are of the same length as the spaces. Simultaneous occurrence of marking pulses on all three Q conductors or simultaneous cessation of marking pulses on these three conductors is not sufficient to cause the current through resistor 116 either to be made or broken and so does not cause the ring J to step. The reason for this is seen from the timing diagram where it is shown that at the time the marking pulses begin and end on the Q conductors, the grid of tube 120 is always positive and is maintaining the current unbroken through resistor 116. In this way the stepping of the J ring is made dependent upon the absence of a marking pulse on all three Q conductors at the instant when grid 120 is negative. The operation of the gate G7 with respect to the three R conductors is similar.

The reentry circuit may take on various forms but for illustration it has been represented as comprising the series resistor 130, shunt resistors 142 and 146 and the three gas-filled tubes 131, 132 and 133 together with associated resistors and biasing supplies. The cathodes of the three tubes 131, 132 and 133 are supplied in common from the 500-cycle pulsing supply 140. The plate of each one of these tubes is connected through an individual resistor to the common point 141 and thence through common resistor 142 to ground. One of the grids of each of these three gas-filled tubes is connected to bias potentiometer 144. The other grid of each tube is connected to common conductor 147 leading to reentry input terminal 143. The polarizing source 145 and taps on the potentiometer 144 permit the grids to be adjusted to proper firing voltages when the cathodes have their most negative voltage. These biases are adjusted differently on the three tubes so that if the voltage applied to the input terminal 143 from the resistors W and Z lies in the range 0 to 5 steps of voltage none of the gas-filled tubes 131, 132 and 133 fires when its cathode is thrown negative. If the total voltage applied to the input terminal 143 has a value of six steps or greater, the negative bias on the grid of tube 131 is overcome and at the instant when the cathode is thrown to its negative voltage, this tube fires and transmits current through its individual plate resistor and through common resistor 142 to ground. The value of the resistor 142 is so chosen that this current produces a voltage corresponding to six steps across resistor 142. This voltage is in such direction as to subtract six steps of voltage from that applied through resistor 130 to the output stepper circuit 150. In other words, when there are exactly six steps of voltage applied to the terminal 143 the output at 151 is zero.

When the voltage applied to the terminal 143 amounts to twelve steps or greater the bias on the grid of tube 132 is overcome allowing this tube as well as tube 131 to fire. This sends current through common resistor 142 of such value as to subtract twelve steps of voltage from that transmitted through resistor 130 to output stepper circuit 150. When the input voltage amounts to eighteen steps or greater, all three tubes 131, 132 and 133 fire when their cathodes are driven negative and eighteen steps of voltage are caused to be subtracted from the voltage transmitted through resistance 130. In this way, an input voltage of, for example, seven steps produces an output of one step; an input voltage of seventeen steps produces an output of five steps and an input voltage of twenty-one steps produces an output voltage of three steps.

The stepper 150 may be of the same type as the output steppers disclosed in an application of R. L. Miller Ser. No. 542,975, filed June 30, 1944 and contains five gas-filled tubes differently biased on their input sides so as to be fired in combinations of 0, 1, 2, etc., depending upon the magnitude of the input voltage at the instant when the supply pulse source 148 supplies an enabling voltage to the cathode-anode circuit. The timing of the supply pulses in circuit 148 is such as to sample the output reentry pulses near their middle portion. The pulses in the output of the stepper 150 may be used as the key pulses in a system of the type shown by Miller in lieu of the key pulses supplied in that disclosure from a phonograph record.

Figure 6:
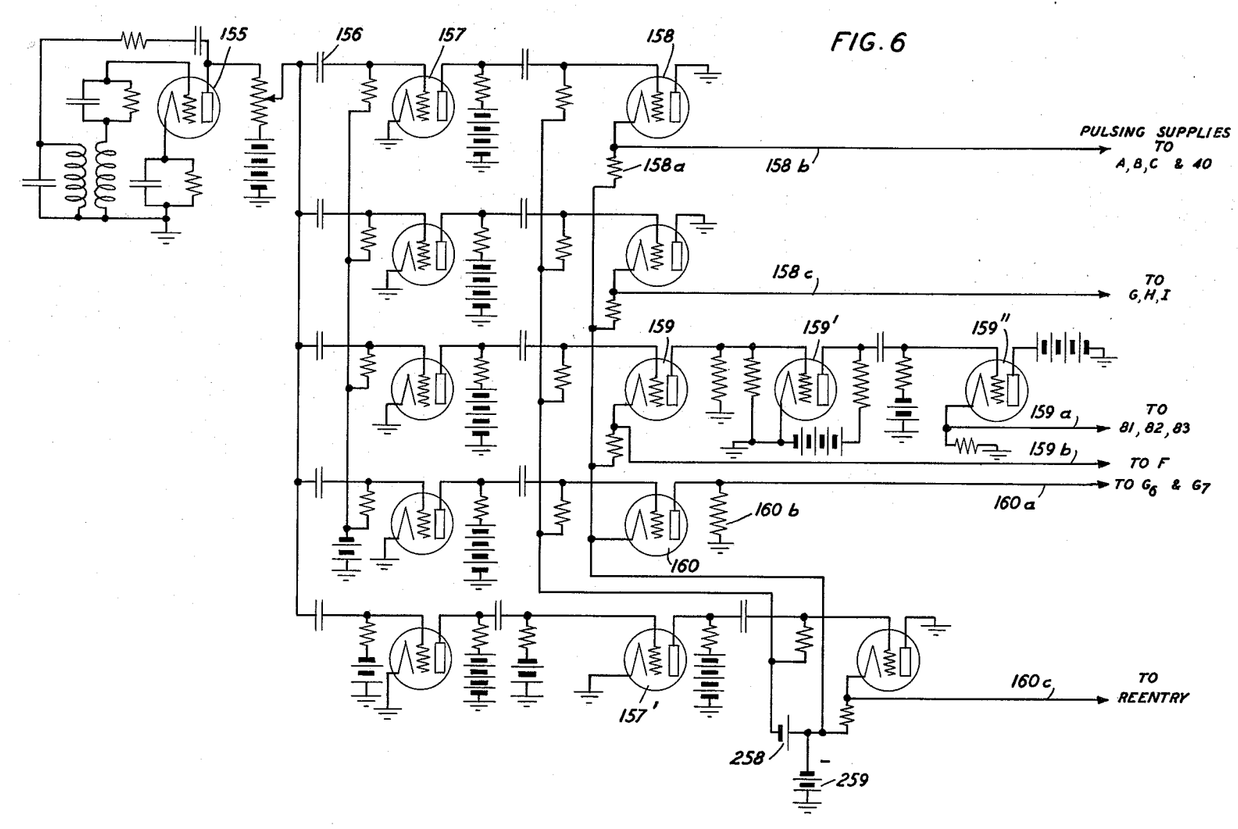
FIG. 6 is a schematic circuit diagram of the 500-cycle pulsing supply for the system shown in FIGS. 2 to 5.

Referring to FIGS. 6 and 7, an example of a pulse generating system is given in FIG. 6 for supplying pulses in accordance with the timing chart of FIG. 7. In FIG. 7 a scale in milliseconds is shown across the top of the figure and the relative timing of the various pulses supplied to different parts of the system are given in the several horizontal graphs which are labeled at the right. Further description of this figure appears unnecessary.

In FIG. 6, a highly stable type of oscillator is indicated at 155 for generating a 500-cycle sine wave. (This oscillator is designed in accordance with well-known practice to give constant frequency output under actual operating conditions and may, if desired, instead of comprising a single tube, as shown, comprise a system including a crystal controlled oscillator operating at a favorable frequency higher than 500 cycles together with suitable frequency reducing means.) Oscillator 155 feeds into a series of phase reversing tubes 157, the grid circuits of which contain condensers 156 which, together with the associated grid circuit resistances, constitute phase shifting means for determining the relative phase at which the waves are impressed on the grids of the tubes 157.

Considering the uppermost tube 157 in relation to the upper graph of FIG. 7, tube 157 is operated between cut off and saturation in such manner as to impress sharp pulses on the grid of tube 158. Tube 158 is normally cut off by high negative grid bias from battery 258. During the time tube 158 is cut off negative voltage from source 259 is applied to output lead 158b in series with cathode resistor 158a. This represents the steady negative voltage shown in the uppermost graph of FIG. 7 as supplied most of the time to the rings A, B, C and 40. Once per cycle of the wave from oscillator 155 the grid of the tube 158 is thrown highly positive and the internal drop between the cathode and the grounded anode is so small that the voltage on lead 158b is brought nearly to ground potential. This condition lasts for only a small fraction of a millisecond and represents the breaks between the negative voltage pulses in the upper graph of FIG. 7. The time constant of the grid circuit of tube 158 is made small by the coupling capacity so as to favor the production of a short pulse on the grid. The intervening negative pulses occurring half way between the positive pulses drive the grid of tube 158 negative and have no effect on the output.

An essentially similar operation takes place in the circuit leading to output 158c, there being a slight shift in phase of these pulses produced by the proportioning of the condenser 156 of this circuit branch.

Tube 159 operates in the same way to produce negative pulses on conductor 159b. Reversing tubes 159' and 159'' are connected after tube 159 to produce corresponding positive pulses on conductor 159a for supplying the gates 81 to 83. Tube 159 is normally transmitting and tube 159'' is cut off except when a positive pulse is received from tube 159'. The voltage on conductor 160a is derived from across resistance 160b connected between the plate of the output tube 160 and ground. When tube 160 is cut off ground voltage is supplied to conductor 160a. In the momentary interval when tube 160 is conducting, negative pulses are supplied to conductor 160a. In the reentry supply branch a second reversal tube 157' is connected after tube 157. By shifting the phase of the 500-cycle pulses 180 degrees in this tube 157' a smaller shift is necessitated by the capacity 156 to bring the pulses into the phase position shown in FIG. 7. The final tube operates similarly to the tube 158 to produce the pulses on output conductor 160c. The output stepper supply pulses can be similarly produced by another branch (not shown) or since these pulses differ but slightly in phase from those on conductor 158b, they could be produced by a branch similar to the upper branch of FIG. 6 with a slightly different size phase shifting condenser 156.

Figure 8:
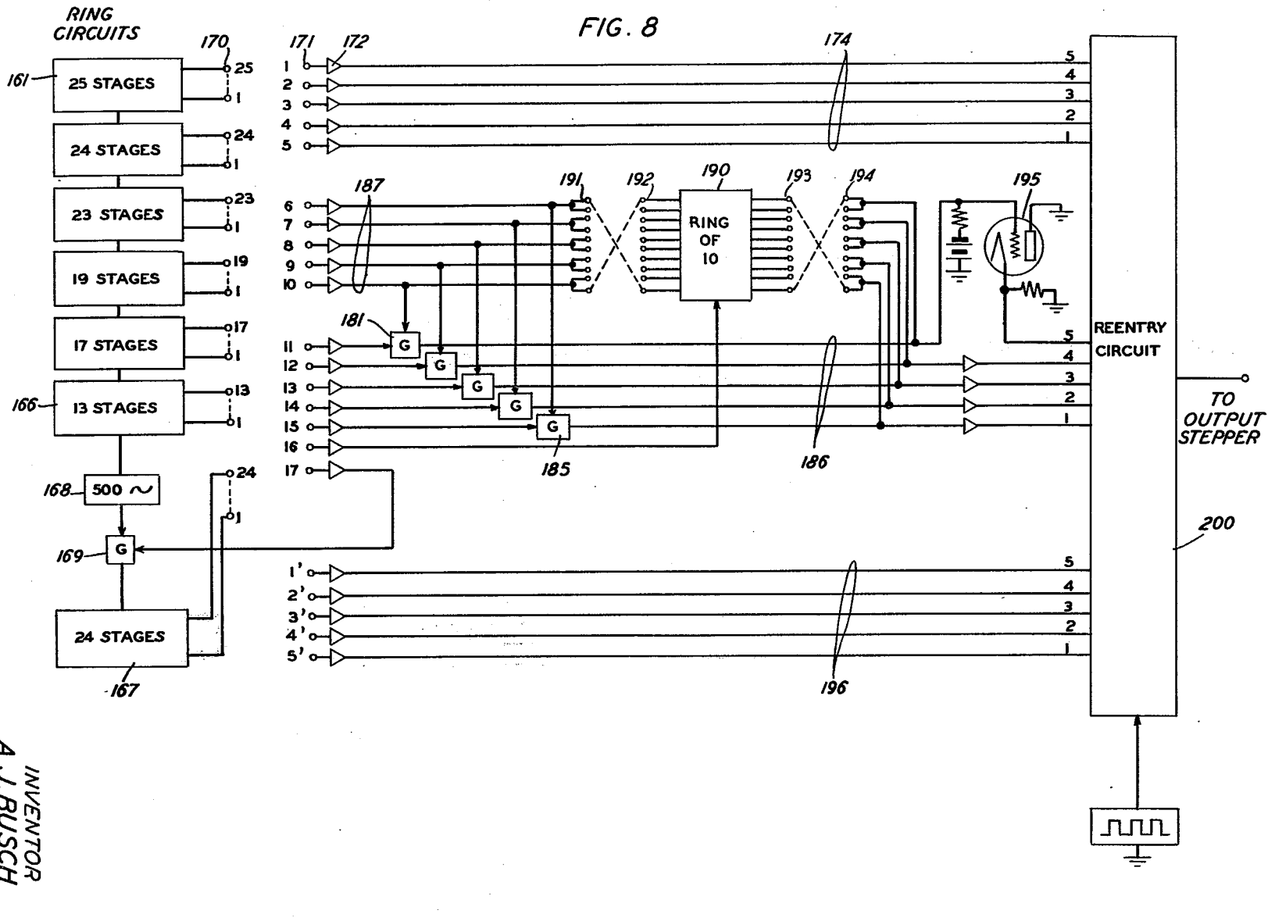
FIG. 8 is a block schematic diagram of an alternative key generating system according to the invention.

FIG. 8 discloses in block schematic form the plan of an alternative keying arrangement operating on the same general principles as the system disclosed in the previous figures. In FIG. 8 six ring circuits 161 to 166 each containing a different number of stages as indicated have their individual stage outputs connected to a group of terminals 170. Each of these ring circuits may be similar to the rings G, H and I (without the reversing and switching tubes). The ring 161, therefore, produces pulses in rotation over the output terminals 1 to 25 of the group 170. The other rings similarly produce pulses in rotation over the output terminals connected to them. These rings are driven in unison from a 500-cycle source 168 which supplies pulses of the general shape indicated in the uppermost graph of FIG. 7. Another stage ring 167 is also driven from this same source through a gate 169 which causes this ring to lose a step occasionally as will be described.

Opposite the terminals 170 are arranged a second group of terminals 171 comprising a group of terminals 1 to 17 and a special group of terminals 1' to 5'. Each one of these terminals in the group 171 leads to the input of a phase reversing tube 172 for the purpose of producing positive pulses in the outgoing conductor groups. Flexible connections not shown are provided for connecting various terminals of the group 170 to the first seventeen conductors of the group 171. For example, of the 145 terminals in group 170, from about sixty to about one hundred may be connected at any one time to the terminals 1 to 17 of group 171. This means, of course, that some or all of the latter terminals will be multipled to a number of terminals in the group 170. These connections may be changed from time to time, such as once a day, in accordance with a prearranged program.

Terminal 17 is connected to one of the input control points of the gate 169. This gate may be similar in construction and operation to the gates 81 to 83 and operates to supply negative cathode voltage to the ring 167 except for a brief instant when both inputs to the gate 169 are positive. The lead from the source 168 should, therefore, be arranged to apply positive pulses to the gate 169 in the manner shown in connection with FIG. 6.

The upper group of conductors 174 lead directly to the reentry 200. Weighting resistors (not shown) are included in these conductors in the input to the reentry circuit for causing a marking pulse on the uppermost conductor to apply an amplitude of five steps to the reentry while marking pulses on the other conductors apply amplitudes of respectively four, three, two and one steps.

The five conductors in the group 187 are brought to ten terminals 191 which can be variously cross connected manually to the ten individual terminals 192 in the input of a special ring circuit of ten stages at 190. The output terminals of the ring 193 may be variously connected manually to ten terminals 194 multipled in pairs to five conductors leading to the group 186. The ring 190 may be constructed similarly to the ring J together with its gating tubes and stepped irregularly under control of the positive pulses from terminal 16 of group 171. Whenever a stage of ring 190 is fired connection is established between corresponding input terminal 192 and output terminal 193 so that a pulse appearing on any conductor 187 is transmitted through the ring 190 to a conductor in the group 186. A gate tube similar to G6 having one section controlled by the pulses from terminal 16 and another section controlled from the 500-cycle pulse source is assumed to be included in the box 190 operating in the same manner as previously described in connection with gate G6 and ring J, for example.

Whenever a positive mark pulse is thus transmitted to one of the conductors 186, the grid of a tube 195 is driven positive to cause such tube to transmit saturation current. Weighting resistors in the reentry input convert these pulses of constant amplitude, the pulses varying in steps from 1 to 5 in the individual conductors.

The five terminals 11 to 15 of group 171 can be connected through gates 181 to 185 to conductors of the group 186. The gates 181 to 185 are normally blocked but can be enabled by application of two pulses, one obtained from one of the terminals 11 to 15 and the other obtained from an individual conductor in the group 187. These gates may be similar to the gates 71 to 75 and when unblocked apply positive pulses to their outputs whenever positive pulses appear on the corresponding terminals 11 to 15. These pulses on the conductors 186 operate through the individual tubes 195 to apply different step values of pulses to the reentry 200 as described in connection with the pulses transmitted from the ring 190. If a conductor in the group 186 has applied to it simultaneously a pulse from the ring 190 and a pulse from one of the gates 181 to 185, the corresponding tube 195 supplies the same output current to the reentry as if only one of the two input pulses were present, since the tube 195 transmits saturation current in either case.

The five special terminals 1' to 5' of group 171 lead directly to the reentry through weighting resistors as in the case of the other groups of five. These terminals 1' to 5' are variously connected to terminals of the ring 167 only, the connection being such that at least four ring points are connected to each of these five terminals. This arrangement is provided to give the six values of output current from reentry 200 a more nearly even distribution.

For the assumed type of connections to the reentry circuit, the maximum pulse value applied at any instant is 29 steps. This reentry can be of the same type as the reentry shown on FIG. 5 except that it must contain one more gas-filled tube to permit rentry to occur at step 24 in addition to the other reentry points.

Two illlustrative examples have been given of ways in which ring circuits having different numbers of stages can be combined in various manners, some stepping regularly and others stepping in an irregular manner under control of the first ring circuits to provide a key generating system of practically infinitely long operating cycle. Gate circuits are also shown as convenient and effective means for exerting controls over ring circuits or other parts of the system. Key generating systems are thus provided which have no physically moving parts but are entirely electronic in character. From these illustrative examples it will be clear how still other types and arrangements may be provided to meet various requirements, still employing the same general principles that have been used in these illustrative examples.

It will be understood that the invention is not to be construed as limited to the details of the present disclosure but its scope is defined in the claims which follow.

What is claimed is:

1. In a pulse-producing system, a plurality of space discharge tube ring circuits each comprising a different number of stages, the numbers of stages in the rings having no common factor greater than one, means to cause said rings to step in unison, means to derive output voltage pulses from certain stages of individual rings and spaces from the other stages, and means to combine the outputs of all of said rings in a common utilization circuit.

2. In a pulse-producing system, a plurality of space discharge tube ring circuits, means to step a plurality of said ring circuits continuously in unison in regularly timed instants, means to step other of said ring circuits discontinuously, means to derive voltages from individual stages of said plurality of, and said other, ring circuits one at a time and means to combine the derived voltages from all of said ring circuits in a common untilization circuit.

3. In a pulse-producign system, a plurality of space discharge tube ring circuits, means to step a plurality of said ring circuits continuously in unison in regularly timed intervals, means to derive from respective stages of said given ring circuits marking and spacing voltages, means to cause certain of the derived voltages from said given ring circuit to initiate stepping in another of said ring circuits, means to derive marking and spacing voltages from respective stages of said last ring circuit, and means to combine for use simultaneously existing voltages derived from stages of both ring circuits.

4. In a pulse-producing system, generators of irregular pulses in different length cycles comprising space discharge tube ring circuits each containing a different number of stages with interstage couplings for causing the stages to become operative one at a time cyclically, means to operate the stages in all ring circuits in unison, an output conductor for each ring circuit, means in each ring circuit for supplying currents of one value to the respective output conductor in response to operation of certain stages and for supplying a different value of current, including zero value, to said conductor in response to operation of other stages, and means to combine the currents from the output conductors of said ring circuits to produce pulses in a relatively long cycles.

5. In a key pulse-producing system, space discharge tubes arranged in different numbers in groups, coupling circuits from each tube to the next within each group, means to cause a tube in each group to operate and in operating to produce an output pulse and to condition the next tube for operation, means to cause all of the tubes in each group to operate one at a time in closed cycles, means to select output pulses from only a portion of the tubes in each group, and means to combine the output pulses from the different groups to form a succession of irregularly occurring pulses.

6. The subject-matter claimed in claim 5 including a group of output terminals, a load circuit to be supplied with pulses from said terminals and means for distributing in rotation to said output terminals the pulses produced by said groups of tubes, said terminals differing in number from the number of tubes in said groups.

7. In a pulse-producing system, a plurality of space discharge tube ring circuits containing different numbers of stages, means to simultaneously energize the stages in each ring one at a time in succession in closed cycles, means to derive output pulses from individual selected stages, less than all, in each ring circuit, means to distribute the derived pulses over N different terminals in irregular order, means to translate pulses on each of said terminals into an output pulse having a step value the same as the number of the terminal, said step values ranging from zero to N steps, and means to apply said output pulses to a load circuit.

8. The combination of the pulse-producing system claimed in claim 7 and an auxiliary pulse-producing system for producing in irregular order output pulses having step values ranging from zero to N steps,, said pulses occurring contemporaneously with the output pulses of the first system, means for adding the output pulses of both said systems and means for reentering the summation pulses to produce final pulses having a range of pulse values of zero to N steps.

9. In a system for producing multivalued pulses having a practically random distribution with time, means operating in different length cycles for generating two-valued pulses in irregular order of occurrence within each cycle, means to variably distribute pulses from the different cycles over a number of fixed terminals, means to translate pulses on individual terminals into pulses having respectively different values, means to produce other two-valued pulses in irregular sequences, means to variably distribute said other pulses over other terminals of a fixed number, means to translate pulses on individual ones of said latter terminals into pulses having respectively different values, and means to add said latter different valued pulses to the first-mentioned different valued pulses.

10. A pulse-producing system for producing a long cycle of irregular pulses comprising a plurality of means to produce short cycles of pulses of different lengths of cycles, means to apply pulses from certain of said means to a set of terminals, means to distribute pulses from others of said pulse-producing means in irregular manner over another set of terminals, means to weight the strengths of pulses on individual terminals of each set, and means to combine the resulting weighted pulses into a single series.

11. In a pulse-producing system for producing a long cycle of irregular pulses comprising a plurality of means to produce short cycles of pulses of different lengths of cycle, distributor means for distributing pulses from a plurality of said means over a set of terminals, space discharge tube ring circuits each having tubes conductive one at a time, means controlled by pulses from certain of said means for determining the tube in a given ring circuit that is conductive at a given time, means controlled by individual conductive tubes of said ring circuits for applying pulses to a second set of terminals, and means to combine the pulses from both sets of terminals.

12. The combination of a plurality of incoming pulsing circuits including generators of pulses occurring irregularly in cycles the total number of possible pulses per cycle in respective generators being prime to one another, and an electronic permuter having a group of discharge tubes per incoming circuit and a set of output terminals corresponding to each incoming circuit, the number of tubes in a group being the same as the number of output terminals in a set, and an electronic tube ring circuit stepping at the pulse rate for enabling one tube in each group simultaneously to transmit a pulse from the corresponding incoming circuit to that one of the corresponding output terminals determined by the enabled tube.

13. In combination, generators of pulses in repeating cycles of different length, other generators of pulses comprising devices for variously combining pulses from said first generators, means for continuously changing the manner of combining such pulses to produce combination pulses, and means for combining said combination pulses with the pulses produced by said generators.

14. In a key pulse-producing system, ring circuits of different numbers of stages, means to step said ring circuits regularly and in unison means to pick up pulses from selected stages of said ring circuits in a plurality of output circuits, other ring circuits, means to step said other ring circuits irregularly under control of pulses in said output circuits, means to pick up pulses from selected stages of said other ring circuits, and means to add said last-mentioned pulses to the pulses picked up from said first-mentioned ring circuits.

15. A key pulse-producing system according to claim 14 including distributor means between said plurality of output circuits and said other ring circuits for distributing in irregular manner to said other ring circuits the control pulses from said output circuits.

16. In a key pulse-producing system, two systems of ring circuits, the first of which comprises a plurality of ring circuits of respectively different numbers of stages, means to step said first ring circuits regularly and in unison, means to pick up from certain stages thereof pulses in a plurality of output circuits, said second system also comprising a plurality of ring circuits of respectively different numbers of stages, means to pick up pulses from selected stages of the latter ring circuits, means to combine said picked up pulses from the ring circuits of both systems to form key pulses, and means to control the stepping of the ring circuits of said second system from pulses produced by ring circuits of the first system.

17. In a key pulse producer, a plurality of ring circuits of different numbers of stages, means to step said ring circuits regularly and in unison, a first group of output conductors, means to send pulses into said group of conductors from selected stages of said ring circuits, another group of output conductors, leads from certain stages of the ring circuits to conductors of the other group, gate devices in said leads for effectively permitting and blocking transmission of pulses along said leads, means controlled by pulses from said ring circuits to actuate the gate devices in individual leads to change them from blocking condition to the condition in which they transmit pulses to conductors of the other group, and means to combine pulses in both groups of conductors to form key pulses.

18. A key pulse producer according to claim 17 including at least one additional ring circuit, means to step said one ring circuit irregularly under control of pulses from the first-mentioned ring circuits, means to select pulses from certain stages of said one additional ring circuit, and means to combine said last pulses with the pulses in both groups of conductors to form key pulses.

19. In a pulse-producing system, a group of electronic ring circuits of different numbers of stages, a source of pulsing current, means to step said ring circuits regularly and in unison under control of pulsing current from said source, an extra electronic ring circuit, means to step said extra ring circuit under the joint control of pulsing current from said source and pulses derived from certain stages in said group of ring circuits, to cause said extra ring circuit to fail to step from time to time, and means to combine pulses from certain stages of the ring circuits of said group with pulses from said extra ring circuit to form output pulses.

* * * * *